(No Model.) 3 Sheets—Sheet 1.
H. K. PORTER.
BOLT CLIPPER.
No. 484,670. Patented Oct. 18, 1892.

(No Model.) 3 Sheets—Sheet 2.
H. K. PORTER.
BOLT CLIPPER.

No. 484,670. Patented Oct. 18, 1892.

Witnesses:
C. L. Power,
John J. Kiernan

Inventor:
Henry K. Porter
per T. W. Porter, Atty.

(No Model.) 3 Sheets—Sheet 3.
H. K. PORTER.
BOLT CLIPPER.
No. 484,670. Patented Oct. 18, 1892.
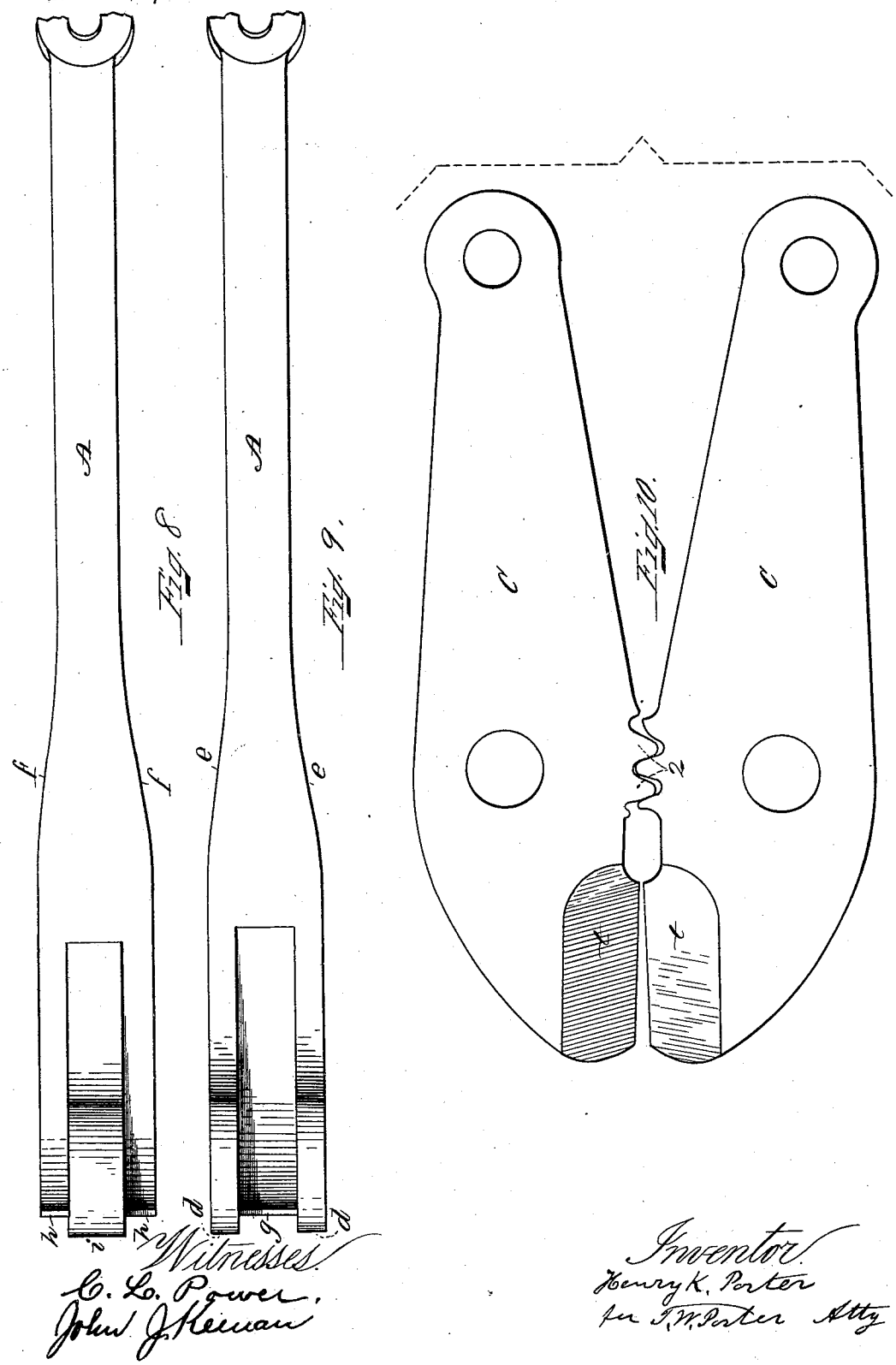
Witnesses
C. L. Power
John J. Kiernan
Inventor
Henry K. Porter
per T. W. Porter Atty

UNITED STATES PATENT OFFICE.

HENRY K. PORTER, OF BOSTON, MASSACHUSETTS.

BOLT-CLIPPER.

SPECIFICATION forming part of Letters Patent No. 484,670, dated October 18, 1892.

Application filed May 18, 1892. Serial No. 433,449. (No model.)

*To all whom it may concern:*

Be it known that I, HENRY K. PORTER, of Boston, in the county of Suffolk and State of Massachusetts, have invented a new and useful Improvement in Bolt-Clippers, which will, in connection with the accompanying drawings, be hereinafter fully described, and specifically defined in the appended claims.

Figure 1:
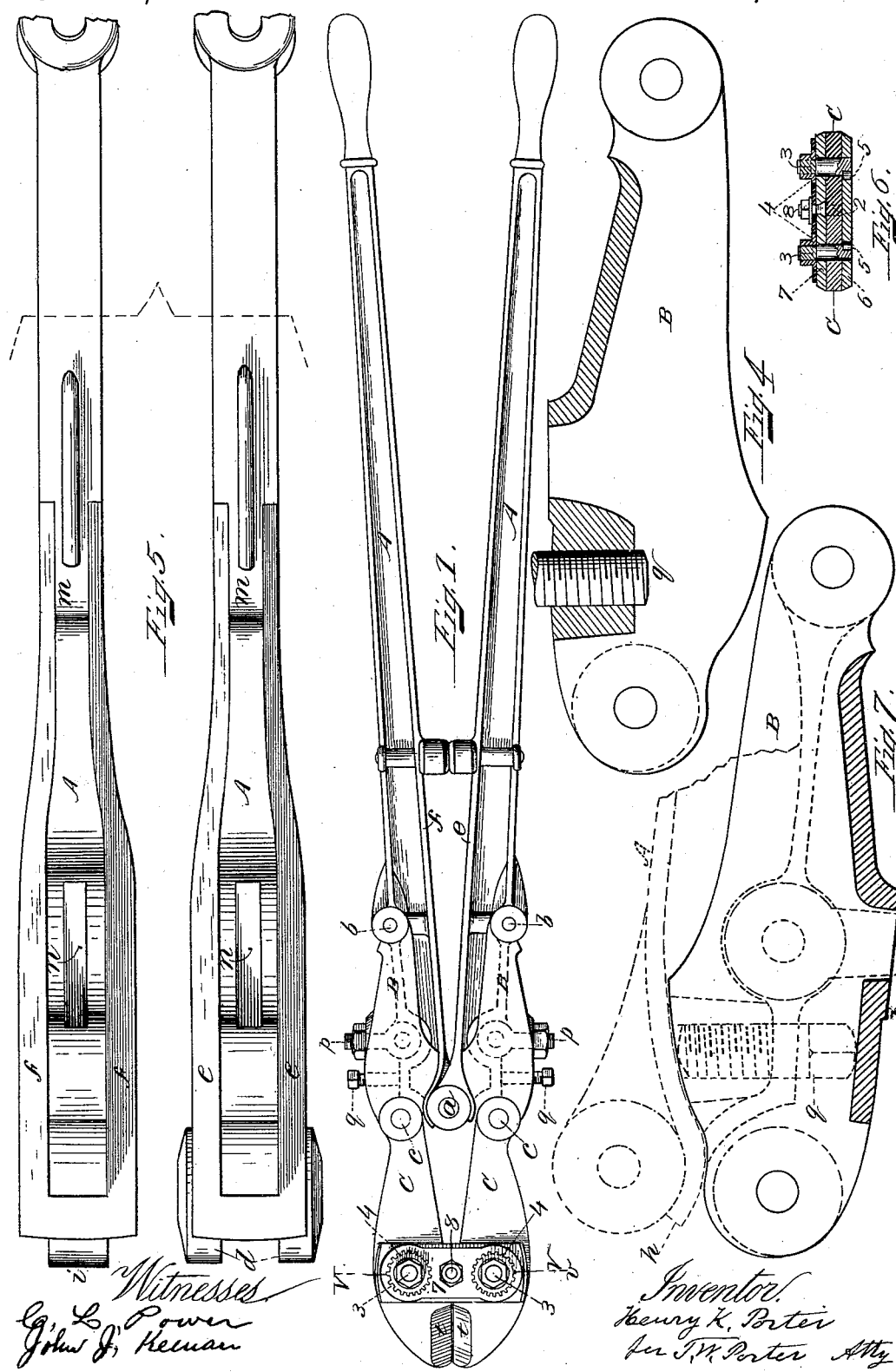
Figures 2, 3:
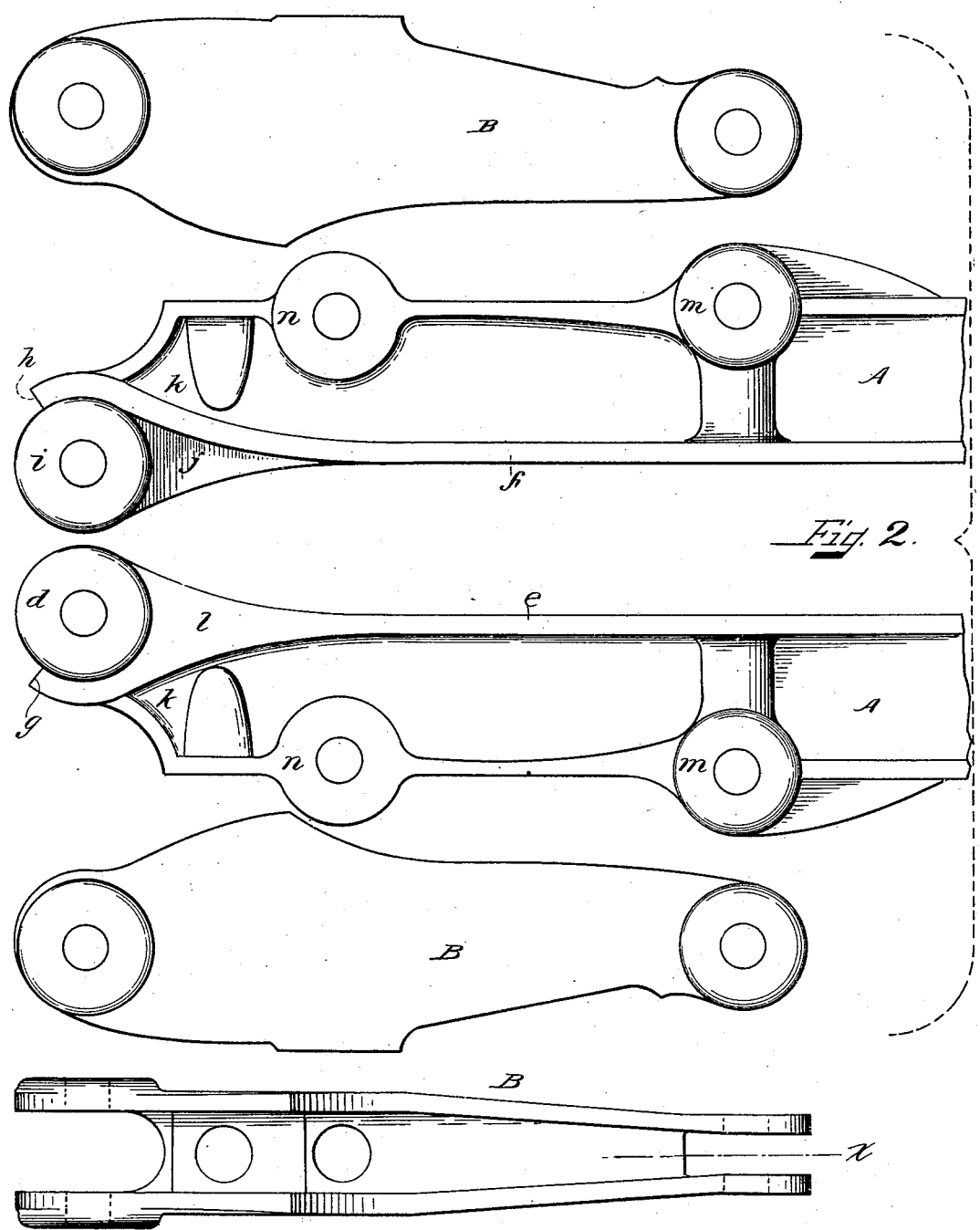

In the drawings, Figure 1 is a top plan view of my bolt-clippers as assembled for use. Fig. 2 shows the forward portion of the handles and the adjusting-levers, as in Fig. 1, only that the parts are not assembled, but are in their relative positions for being assembled. Fig. 3 shows one of the adjusting-levers in inner edge elevation. Fig. 4 shows one of the adjusting levers in longitudinal section, as on line $x$, Fig. 3, with the adjusting-screw in place in the lever. Fig. 5 shows the two handles in outer edge elevation, the rear portion being broken away. Fig. 6 is a transverse section on V, Fig. 1. Fig. 7 is a view like Fig. 4, except that the handle is shown in place in dotted lines, and the adjusting-screw is shown as threaded in the handle. Fig. 8 is an inside edge view of one of the handles. Fig. 9 is a similar view of the other handle, the rear portion of both said handles being broken away. Fig. 10 is a top plan view of the cutting-jaws shown detached from the other parts.

This invention has for its object certain improvements in the bolt-clippers patented by me on April 6, 1880, January 18, 1881, and August 9, 1881; and the invention will, in connection with the accompanying drawings, be next herein fully described, and then pointed out in the appended claims.

No occasion will arise for referring to the rear portion of the handles except generally, as nothing in said rear portion is herein claimed.

Referring again to the drawings, A A represent the "levers" or "handles," as they are termed, which are pivoted together at pivot $a$, one lever being formed to enter within the other, as shown in Figs. 2 and 5.

The adjusting-levers are shown at B B as pivoted to levers A at $b\ b$, and they are pivoted to the cutting-jaws C at $c\ c$. As heretofore constructed, the adjusting-levers B and the handles A have been so respectively formed that the two abutted together edge to edge, and hence the ears $d\ d$ of the handles A had a connection therewith that extended about ninety degrees of their circle, while by my present mode of construction said ears are connected with the main portion of the handles by one hundred and eighty degrees of the circle, as is shown in Fig. 2. The inside ribs $e\ f$ of the handles are near the front end of the handles deflected outward and joining and curving round the ears $d\ i$, terminate at $g\ h$, so as to constitute stops, which serve as the ultimate limit to which said handles can be opened. The rib $f$ rises above the lip portion $j$ and also above the outer portion $k$, while rib $e$ is broadened at $l$ and rises above the outer portion $k$ and terminates at $g$ on the outside of ear $d$, and also extends to the inside of ear $d$. On the outside of said ribs $e$ and $f$ the handles are alike, they having the boss $m$, to which the rear ends of the adjusting-levers are pivoted, and the front boss $n$, in which are pivoted the eyebolts $p$, which hold the adjusting-levers B in place.

The set-screws $q\ q$ serve as the means by which levers B are set outward to compensate for the wearing away and sharpening of the cutting-edges $t\ t$ of cutters C. In Fig. 4 said screw $q$ is shown as threaded in the adjusting-lever and bearing against handle A, while in Fig. 7 it is threaded in handle A and bears against the inside of lever B; but said different arrangements are each equivalents of the other, but I prefer that first described.

It will be seen that levers B have the requisite interior room or space, so as to receive the outer portion of levers A within them, and by thus forming the respective parts greater strength is obtained than when the parts do not thus enter one within the other. The cutters C C interlock each with the other by reason of teeth 2, in order to insure the correct alignment of said cutters relatively to handles A, and as the severe uses to which the cutter is applied renders the pivot-bolts 3 liable to turn round and work loose I secure them and their nuts 4 firmly in place by inserting the pins 5 midway between the bolts and the strap 6, in which the bolts are inserted, and the nuts are formed with a circle of teeth about their base and the locking-plate 7 has teeth that interlock with said nuts, while said plate is secured in position by the short bolt 8, that passes through strap 9 and said locking-plate.

It will be obvious that instead of inserting the eyebolts $p$ in the flattened bosses $n$ a bolt may pass entirely through handles A and through levers B; but the method shown is deemed greatly superior to a bolt passing through the levers.

I claim as my invention—

1. In bolt-clipper handles formed, respectively, with the inside ear $i$ and the outside ears $d$, arranged to be united by rivet $a$, as the joint of the handles, the rib $f$, arranged at the inner edge of the handle, but curved outward and then inward at its forward end to conform to said ears $d$ $i$, and the rib $e$, also formed at the inner edge of the handle and broadened at its forward portion to embrace ear $d$, so that the terminals $g$ $h$ of said ribs serve as straps to arrest the opening of the handles before parts C are brought together, substantially as specified.

2. In a bolt-clipper, and in combination with cutting-jaws C and handles A, the adjusting-levers B B, pivoted to said handles and jaws and formed with an internal cavity or space, and said handles formed with a corresponding size, so as to enter within the adjusting-levers, substantially as specified.

3. In combination with the adjusting-levers B, to which jaws C are pivoted, the handles A, formed with the flattened bosses $n$ and eyebolts $p$, so constructed and arranged that said bosses will enter the slots in said levers and the eyebolt will pass out through said levers to be engaged by a nut, substantially as specified.

4. In a bolt-clipper, the combination of handles A and the levers B, pivoted to said handles and to cutters C, the eyebolts $b$, pivoted in handles A and extended through said levers, and screws $q$, arranged to adjust said levers relatively to said handles, all substantially as specified.

5. The combination of cutting-jaws C, bolts 3, the pins 5, interlocked with the bolts and plate 6, nuts 4, secured on said bolts and provided with teeth, and locking-plate 7, engaging said nuts and secured in place by bolt 8, passing through strap 9 and plate 7, substantially as specified.

HENRY K. PORTER.

Witnesses:
C. L. POWER,
JOHN J. KEENAN.